Figure 1:
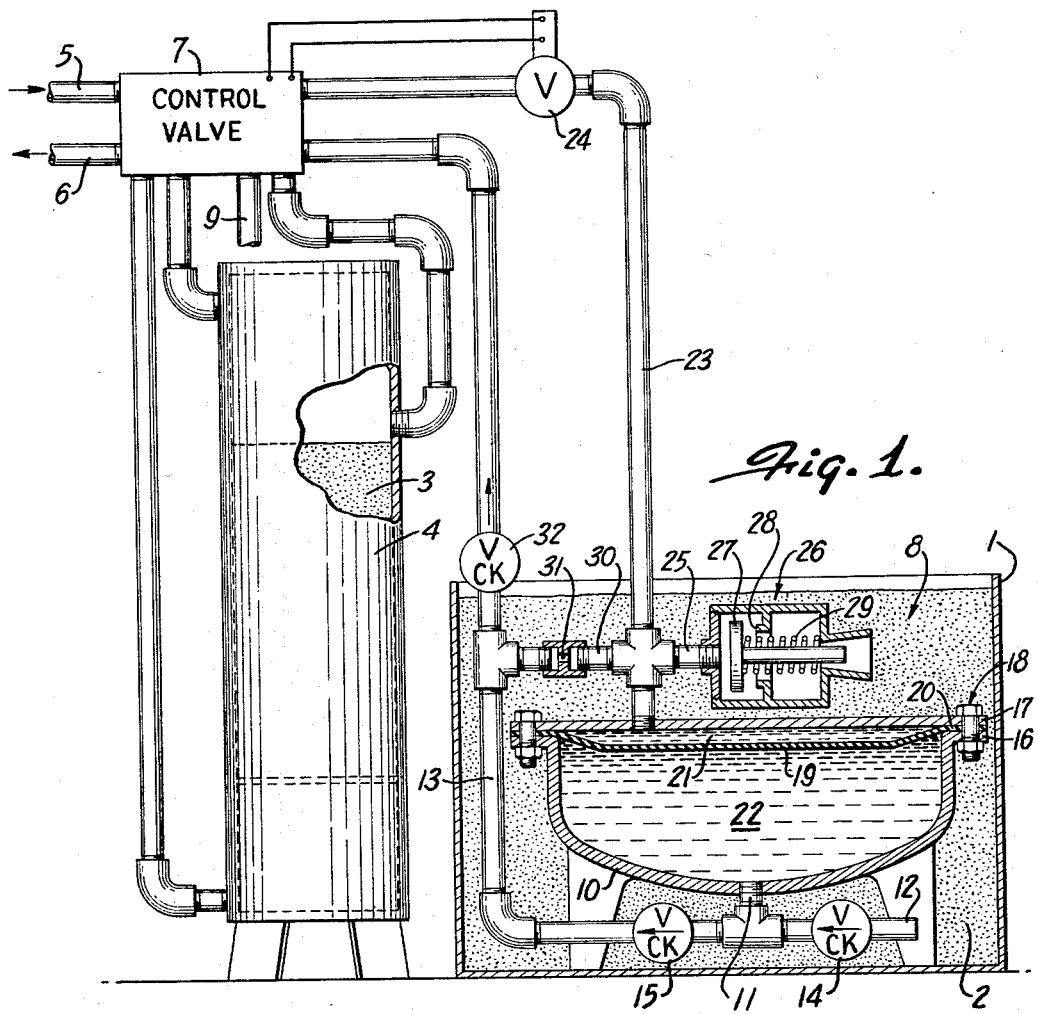

Nov. 22, 1966 W. A. STAATS 3,286,840
PULSATING FLUID PUMP
Filed Jan. 8, 1964

INVENTOR.
WILLIAM A. STAATS
BY
Andrus & Starke
ATTORNEYS

United States Patent Office 3,286,840
Patented Nov. 22, 1966

3,286,840
PULSATING FLUID PUMP
William Albert Staats, Torrance, Calif., assignor by mesne assignments, to Culligan, Inc., Northbrook, Ill., a corporation of Delaware
Filed Jan. 8, 1964, Ser. No. 336,482
11 Claims. (Cl. 210—134)

This invention relates to a pulsating fluid pump and particularly to such a pump for delivering a regenerating brine solution to a water softener for regeneration of an ion exchange bed.

In many areas, the water contains hardening minerals which are desirably removed from the water prior to its use. Water softeners of the ion exchange type normally include a granular bed of a zeolite or resin through which the water is passed. The bed is placed in the active state by saturation with sodium ions as by immersion in a salt water or brine solution. As the water passes through the bed, the sodium ions are exchanged for the hardening ions in the water to produce soft water.

The granular bed must be periodically regenerated to replace the hard water forming ions with the soft water forming ions. This is done by the provision of a salt or brine tank in which a brine solution is provided for periodic introduction into the softener during a regeneration cycle.

Automatic and semi-automatic water softeners are available having means for automatically introducing the necessary brine solution or brine into the water softener during a regeneration cycle. For example, applicant's copending application entitled "Method and Apparatus for Ion Exchange Regeneration" Serial No. 336,555, filed on January 8, 1964 and assigned to a common assignee, discloses a water softening system wherein a series of brine solutions is fed through the softener during a regeneration cycle to establish a highly effective water softening system.

The present invention is particularly directed to a small fluid pump which may be used to provide quantities of brine for delivery under pressure to the softening bed. The fluid pump of the present invention allows use of an unpressurized salt storage tank and pulse brining of the mineral bed for maximum efficiency of the regenerating cycle.

Generally, in accordance with the present invention, a fluid actuated pump is provided having a working chamber divided into an actuating chamber and a fluid transfer chamber by a movable pump member which is resiliently loaded to a normal position. The transfer chamber is connected to the unpressurized brine tank and to the softener tank with valve means to restrict flow from the brine tank to the softener. The actuating chamber is selectively connected to the water system in which the softener is connected and is preferably also connected to the salt storage tank and to the softening tank. A pressure controlled valve or the like is provided in the connection to the storage tank and an orifice is provided in the connection to the softening tank.

In operation, when the actuating chamber is operably connected to the water supply system, water is transferred at the system pressure into the actuating chamber and also tends to flow to the connection to the salt storage tank. The water pressure however is effective to close the pressure controlled valve and prevent water flow therethrough. The water pressure is then transferred to the actuating chamber and acts upon the movable pump member causing it to move into the transfer chamber and force the brine solution therein outwardly into the softening or mineral tank. A small flow exists through the bypass line to dilute the brine solution. As a result, the brine solution can be relatively concentrated and reduced to a desired solution by mixing with the bypassed water.

The water line is subsequently operably disconnected from the water system. The resiliently loaded pump member returns to the normal position as the incoming water supply pressure is removed. In so moving, the pump member forces the water in the actuating or working chamber outwardly through the orifice in the bypass line. When a preselected quantity of the trapped water has been discharged, the pressure above the movable pumping member has decreased to a level which permits the pressure controlled valve to assume the open position. The balance of the trapped water is then forced outwardly through the valve line into the salt storage tank. The quantity of trapped water will increase to approximately 90% to 100% concentrated brine volume.

The drawing furnished herewith illustrated the best mode presently contemplated for carrying out the invention.

Figure 2:
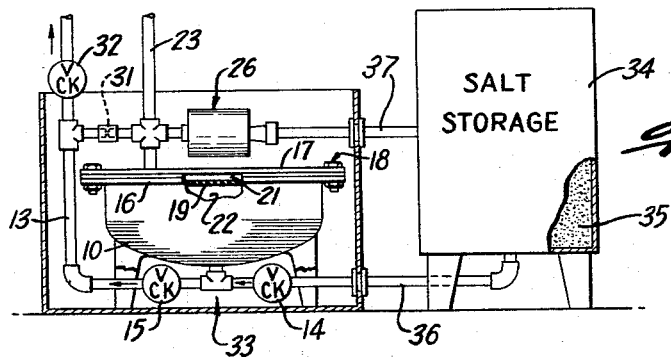

In the drawing:

FIG. 1 is an elevational view of a softening system with parts broken away to show a fluid pump constructed in accordance with the present invention; and FIG. 2 is an alternative embodiment showing a completely separate brine tank and pump constructed in accordance with another aspect of the present invention.

Referring to the drawing and particularly to FIG. 1, a salt storage tank 1 is shown having a layer or bed of salt 2 in the bottom portion thereof. An ion exchange bed 3 of zeolite or resin is supported within a water softener tank 4 and connected to be periodically subjected to a brine solution from tank 1. The salt 2 is any of the suitable common salt which when mixed with water forms a brine solution suitable for regeneration of softening beds.

The softener tank 4 is interconnected to a hard water line 5 and a soft water supply line 6 by a suitable control valve 7 to direct the water normally downwardly through the ion exchange bed 3 with the hardening ions in the water being removed as the water is passed through the ion exchange bed 3. The control valve 7 may be any automatic or manually controlled unit adapted to disconnect the softener from between the lines 5 and 6 and interconnect a brine pump assembly 8 supported in the salt storage tank 1 to the softener tank 4 for regeneration of the ion exchange bed 3. In accordance with common practice, the control valve 7 may include a bypass which directly connects lines 5 and 6 to maintain an output supply of water available at the supply line 6 during the regeneration cycle.

The brine pump assembly 8 in the first embodiment of the invention is embedded in the very bottom of the tank 1 within the salt 2 and contains a brine solution which is adapted to be transferred to the softener tank 4 under pressure, as more fully described hereinafter. After transmittal of the brine solution, a rinse water is provided through the pump assembly 8 for rinsing the brine solution outwardly through the control valve 7 to a suitable discharge or waste drain line 9.

The illustrated pump assembly 8 includes a generally cup-shaped casing 10 with a common inlet-outlet pipe 11 secured in the very center of the casing. A brine inlet pipe 12 is secured to the common pipe 11 and terminates adjacent thereto and in the bottommost portion of the tank 1. A brine pipe 13 is connected at one end to the pipe 11 and at the opposite end to the softener tank 4 immediately above the level of bed 3. Pipes 12 and 13 are provided with check valves 14 and 15, respectively. Check valve 14 in pipe 12 permits only flow from the salt storage tank 1 into the brine pump casing 10. Similarly, the check valve 15 permits only discharge of the brine solution through pipe 13 and prevents the opposite flow of water or solution into the pump casing 10. The brine solution can then be drawn from tank 1 into casing 10 and subsequently discharged via pipe 13 to tank 4.

The upper end of the casing 10 includes an encircling attachment flange 16 to which an upper closure plate 17 is releasably secured by a plurality of circumferentially distributed bolt and nut assemblies 18. A flexible resilient diaphragm 19 spans the uppermost edge or plane of the pump casing 10 and is clamped at the edge 20 between the closure plate 17 and the encircling flange 16. The diphragm 19 may be formed of a suitable natural or synthetic rubber, a suitable plastic or any other material which will flex and return to the normal position. The flexible resilient diaphragm 19 establishes an operating chamber 21 between the inner surface of the closure plate 17 and the diaphragm 19 and a pumping chamber 22 between the diaphragm and the casing 10. A water actuating line 23 is connected to the hard water line 5 through the control valve 7 and to the center of the closure plate 17. A solenoid operated valve 24 is provided in the pipe 23 to selectively connect and subject the fluid pump assembly 8 to the pressure of the water supply system during the regeneration cycle. When water is passed through line 23, the diaphragm 19 will be forced into the casing 10 and thus force the brine solution held therein outwardly through the brine line 13. The check valve 14 in line 12 will prevent return of the brine solution to tank 1. When the pressure is removed and the flexible diaphragm 19 allowed to relax to the normal position, a suction force is established within casing 10, drawing brine solution from the salt storage tank 1 through the inlet pipe 12 into the casing 10.

A water supply pipe 25 is connected to the actuating pipe 23 and discharges immediately within the salt bed 2 in the storage tank 1 immediately above casing 10. A pressure release valve 26 is mounted in pipe 25 and is actuated by the water pressure from pipe 23.

The illustrated release valve 26 includes a valve closure member 27 which is movable mounted with respect to a valve seat 28. A spring 29 is disposed between the valve closure member 27 and the discharge end of the valve 26 and continuously biases the closure member 27 in spaced relation to the valve seat 28. In the absence of a preselected pressure being applied to the release valve 26 via pipe 23, the valve is open and provides a free passageway for the transfer of water from the pipe 23 to the storage tank 1.

A water bypass pipe 30 is connected between pipe 23 and the brine pipe 13. A small orifice 31 is constructed within the bypass pipe 30 to provide a restricted water flow under pressure from the line 23 to the line 13. A check valve 32 in pipe 13 to the discharge side of the pipe 30 prevents flow of liquid from the softener tank 4 back through the pipe 30 and pipe 23.

The bypass pipe 30 establishes a small flow of water into the brine pipe 13 during the transfer of the brine solution from the pump 10 to the tank 4. As a result, a relatively concentrated solution of brine solution can be employed with the desired dilution being effected by the water flowing through the orifice 31. Further, after the pump assembly 8 discharges the brine solution to the tank 4, a small stream of water continues to flow through the orifice 31 and through the softener 4 to effect the washing function and removal of all excess brine.

Generally, the operation of the invention illustrated in FIG. 1 is summarized as follows. Normally, the control valve 7 connects the hard water line 5 and the soft water line 6 to the top and bottom of the tank 4 such that the hard incoming water passes downwardly through the ion exchange bed 3 and is discharged through line 6 as softened water. During the softening process, the ion exchange bed 3 gives up softening ions and takes on water hardening ions. After a selected period, the ion exchange bed 3 must be regenerated by the brine solution.

When it is desired to regenerate bed 3, the control valve 7 is moved, either automatically or manually, to a regenerating position wherein lines 5 and 6 are disconnected from the softener tank 4 and may or may not be directly interconnected to maintain a water supply to line 6. When the control valve 7 moves to the regeneration position, the solenoid valve 24 is actuated to open pipe 23, transmitting the water supply pressure of line 5 to the actuating or operating chamber 20 of the pump assembly 8. This pressure is also applied directly to the valve closure member 27 of release valve 26 and forces the closure member into sealing engagement with the valve seat 28 and thus maintains continued pressure on the diaphragm 19 of the pump assembly 8. The continued pressure thereon causes the diaphragm 19 to deform into the pump casing 10 and forces the brine solution out through the check valve 15 into tank 4 where it passes down through bed 3 and thence through valve 7 to drain line 9. The check valve 14 prevents the brine solution from flowing back into the salt storage tank 1. The brine solution in passing through the ion exchange bed 3 replaces the hardening ions with softening ions. The bed 3 is then washed of excess brine solution, as follows.

Immediately following the discharge of the brine solution from the pump assembly 8, rinse water is fed through the bed 3 from the pipe 23 and pipe 30 through the orifice 31. The diaphragm 19 is held down or in the stretched position during the slow rinse period of the regeneration cycle by the water pressure in pipe 23. After a complete rinse of the ion exchange bed 3 to remove all excess brine solution, the solenoid valve 24 is closed with a predetermined quantity of water trapped between the solenoid valve 24 and the deformed diaphragm 19.

The tension in the rubber diaphragm 19 causes it to return to the normal position with the water trapped above the diaphragm bleeding through the orifice 31 to the ion exchange tank 4.

As the diaphragm 19 returns to the normal position, the pressure of the trapped water reduces accordingly. When a selected percentage of the trapped water has bled through the orifice 31, the pressure of the water above the diaphragm equals the spring setting of the release valve 26. As a result, the valve closure member 27 moves or pops rapidly to the open valve position and the pipe 25 provides a relatively large passageway compared to orifice 31. The trapped water therefore passes directly through pipe 25 to the salt storage tank 1. The water filters downwardly through the salt and increases in volume to approximately 90% to 100% of the total volume of the pump casing 10.

During the period when the solenoid valve 24 is closed and the diaphragm is relaxing or returning to the normal position, a previous brine solution formed in tank 1 is drawn into the pump casing 10 through the valve 14 in the inlet pipe 12, as follows. The relaxation or return of the diaphragm 19 to the normal position creates a suction force in the bottom portion of the casing. The check valve 15 in the brine pipe 13 holds that line closed and the suction force is only effective to open the valve 14. Generally, in accordance with the present invention, a slight amount of air is drawn in at the very end of the suction stroke, that is, after a complete charge of brine has been introduced into the pump casing 10. Although not required, it provides a very simple means of checking the setting of the release valve 26. Thus, if the release valve 26 is set at too high of a pressure, it will pop to the open position before the selected quantity of the trapped water has been fed to the softener tank 4 and an excess of water will be added at each brine pulse to the salt storage tank 1. This may result in the eventual overflow of the salt storage tank 1.

Although described as producing a single pulse of brine to the tank 4 during the regeneration cycle, one or more additional pulses of the brine solution may be readily provided, if needed by proper timed cyclically operating the water inlet valve 24. The valve would not be held open immediately following the discharge of the initial brine solution but would be closed immediately to allow the diaphragm 19 to relax. This would provide a partial rinse of bed 3 and replenishing water to tank 1 while again filling casing 10, as previously described. As soon as the diaphragm 19 has completely relaxed, the valve 24 would be again opened to recycle the apparatus. When the selected number of pulses of brine solution has been transferred and fed through the bed 3, the valve 24 would be held open to establish and maintain the rinse cycle whereby fresh water would be fed through the bed 3 to rinse all excess brine solution.

In FIG. 1, the brine pump has been shown integrally supported within the salt storage unit. The brine pump assembly can be separately mounted within the scope of the present invention, for example such as shown in the embodiment of the invention illustrated in FIG. 2. In FIG. 2, elements corresponding to the elements of FIG. 1 are similarly numbered for purposes of simplicity and clarity of explanation.

The brine pump 33 is mounted outside of the salt storage unit for example near the softener mineral tank 4 and in spaced relation to a salt storage tank 34. Generally, the salt storage tank 34 is constructed similarly to that of the previous embodiment and includes a bed of salt 35 therein. A brine pipe 36 is connected to the lower end of the brine pump 33 and the lower end of the salt storage tank 34. Feed line 37 from the brine pump 33 is connected to an intermediate point on the tank 34 somewhat higher than that provided when the brine pump is assembled with the storage tank. Generally, the invention of the embodiment illustrated in FIG. 2 functions in accordance with the description of the embodiment of FIG. 1. However, the fresh water transferred from line 37 is sprayed into the salt and would have a somewhat longer contact time. As a result, a more saturated brine solution is provided. In this embodiment of the invention, however, care should be taken to avoid bridging of the salt.

The present invention thus provides a very reliable brine pump for transferring of preselected quantities of brine from a storage unit to a regeneration unit under pressure. The salt storage tank however may be a conventional nonpressurized unit providing convenience of replenishment of the salt bed and the like.

Various modes of carrying out the invention are contemplated as being within the scope of the following claims particularly pointing out and distinctly claiming the subject matter which is regarded as the invention.

I claim.

1. In combination with a brine source and a water softening bed, a cyclically operable fluid pumping system for transferring the brine solution to the water softening bed, comprising,
    (a) a fluid operated pump having a movable pumping member establishing an actuating chamber and a pumping chamber adapted to be connected to the softener bed and to the brine source, said pumping member being resiliently urged to preselected position in said pumping chamber and movable therefrom to effect a transfer of fluid through said pump,
    (b) a pressurized water source selectively operably connected to said actuating chamber, and
    (c) a pressurized relief passageway means between the brine source and said actuating chamber including a resiliently loaded valve means continuously urged to an open position against the pressure in the actuating chamber, said valve means being closed by the pressure differential established thereacross due to a change in pressure in the actuating chamber to a pressure intermediate the maximum and minimum operating pressures.

2. The combination of claim 1 having
    (a) means connecting the actuating chamber to the water softening bed, and
    (b) flow restrictive means in said last-named means.

3. In a brining assembly for periodic transfer of a brine to an ion exchange tank,
    (a) a salt storage tank adapted to contain a bed of highly divided salt and brine,
    (b) a fluid-operated brine pump having an inlet connected to said salt storage tank to receive the brine therefrom and an outlet adapted to be connected to the ion exchange tank,
    (c) a water line adapted to be connected to a pressurized water system and selectively connected to actuate said brine pump to transfer the brine from the pump into the ion exchange tank, and
    (d) means responsive to operable disconnection of said water line to transfer brine from the storage tank to the pump and transfer water into the salt storage tank to replace the brine volume removed.

4. The brining assembly of claim 3 wherein
    (a) said brine pump is mounted in the bottom of the salt storage tank and embedded within the salt.

5. The brining assembly of claim 3 having
    (a) rinse water means for mixing water with brine from the pump and to subsequently transfer rinse water to the ion exchange tank.

6. The brining assembly of claim 5 wherein
    (a) said rinse water means is coupled to the water line and includes restrictive flow control means.

7. In a brining assembly for periodic transfer of a brine to an ion exchange tank from a salt storage tank adapted to contain a bed of highly divided salt and brine,
    (a) a fluid-operated brine pump having an actuating chamber and a pumping chamber adapted to be connected to the salt storage tank to receive brine therefrom and to the ion exchange tank,
    (b) a water line adapted to be connected to a pressurized water system and selectively connected to the actuating chamber to operate said brine pump to transfer the brine from the pump into the ion exchange tank and establishing a reservoir of water at least equal to the water content of the brine in the pump, and
    (c) means responsive to operable disconnection of said water line to transfer said reservoir of water into the salt storage tank to replace the volume of brine removed.

8. In a brining assembly for periodic transfer of a brine to an ion exchange tank,
    (a) a salt storage tank adapted to contain a bed of highly divided salt and brine,
    (b) a fluid-operated brine pump disposed in the bottom of the salt storage tank and embedded within the salt,
    (c) a water line adapted to be connected to a pressurized water system and connected to actuate said brine pump to transfer the brine therefrom and into the ion exchange tank and establishing a reservoir of water at least equal to the water content of the brine in the pump, and
    (d) means responsive to operable disconnection of said water line to transfer water into the salt storage tank in accordance with the volume removed.

9. A pressurized brine pump for a water softening system having a tank for an ion exchange bed periodically regenerated by subjecting the bed to a concentrated salt solution formed in a salt storage unit,
    (a) a two piece pump casing having a flexible diaphragm clamped between the mating edges thereof to form a fluid pump, said diaphragm being stressed to extend in a single plane and defining an upper actuating chamber and a lower pumping chamber,
    (b) a water inlet pipe secured to the casing to the actuating chamber side of the diaphragm,
    (c) a solenoid valve in said water inlet pipe for selective operation of the pump, (d) a bypass pipe connected to said inlet pipe and to the salt storage unit to pass water into the storage unit,
(e) a normally open spring-loaded relief valve in said by-pass pipe and being closed by the pressure differential across said valve due to an increase in pressure in said inlet pipe,
(f) a common inlet-outlet pipe secured to the pumping chamber side of the casing,
(g) a brine inlet pipe connected to the inlet-outlet pipe and to the salt storage unit for transferring of brine to the pumping chamber,
(h) a one-way valve in said brine inlet pipe,
(i) a brine outlet pipe connected to the inlet-outlet pipe and adapted to be connected to the ion exchange tank,
(j) a pair of spaced one-way valves in said brine outlet pipe,
(k) a bypass pipe connected to said outlet pipe between the pair of valves and to the water inlet pipe, and
(l) an orifice in said bypass pipe whereby water is introduced to the ion exchange tank simultaneously with the brine from the pump and subsequently thereto in accordance with continued operation of the solenoid valve.

10. A pressurized brine pump for a water softening system having a tank connected to the incoming water line and including an ion exchange bed periodically regenerated by subjecting the bed to a concentrated brine formed in a salt storage unit,
(a) a diaphragm pump having a flexible diaphragm defining a pumping chamber and an actuating chamber,
(b) a water inlet communicating with said actuating chamber and selectively connected to the incoming water line,
(c) a fluid bypass means connected to said inlet and to the salt storage unit to pass water into the storage unit,
(d) a normally open pressure responsive means in said fluid bypass means and being closed by a pressure differential across said pressure responsive means due to a change in pressure in said inlet to a pressure less than the line pressure and greater than the preselected partial pressure in the actuating chamber,
(e) a brine inlet in said pump connected to the salt storage unit for transferring of brine to the pumping chamber,
(f) a one-way valve means in said brine inlet,
(g) a brine outlet in said pump adapted to be connected to the ion exchange tank,
(h) a pair of spaced one-way valve means in said brine outlet,
(i) a fluid bypass means connected to said brine outlet between the pair of valve means and to the water inlet, said means including an orifice means to establish a restricted water flow to the bed during the regeneration cycle.

11. A pressurized brine pump for a water softening system having a tank for an ion exchange bed periodically regenerated by subjecting the bed to a concentrated salt solution formed in a salt storage unit.
(a) a two piece pump casing having a flexible diaphragm clamped between the mating edges thereof, said diaphragm being stressed to extend in a single plane,
(b) a water inlet pipe secured to the casing to one side of the diaphragm,
(c) a solenoid valve in said water inlet pipe,
(d) a bypass pipe connected to said inlet pipe and to the salt storage unit to pass water into the storage unit,
(e) a spring-loaded relief valve in said bypass pipe and being closed by a pressure differential across said valve due to an increase in pressure in said inlet pipe,
(f) a common inlet-outlet pipe secured to the opposite side of the casing,
(g) a brine inlet pipe connected to the inlet-outlet pipe and to the salt storage unit for transferring of brine to the pump casing,
(h) a one-way valve in said inlet pipe,
(i) a brine outlet pipe connected to the inlet-outlet pipe and adapted to be connected to the ion exchange tank,
(j) a pair of spaced one-way valves in said outlet pipe,
(k) a by-pass pipe connected to said outlet pipe between the pair of valves and to the water inlet pipe, and
(l) a small orifice in said bypass pipe whereby water is simultaneously introduced to the ion exchange tank with brine from the pump casing.

References Cited by the Examiner

UNITED STATES PATENTS

| | | | |
|---|---|---|---|
| 2,496,711 | 2/1950 | Goddard | 103—44 |
| 2,843,050 | 7/1958 | Harper | 103—152 |
| 2,960,936 | 11/1960 | Dean et al. | 103—28 |
| 2,997,177 | 8/1961 | Cleary | 210—140 |
| 3,058,816 | 10/1962 | Rudelick | 23—267 |

REUBEN FRIEDMAN, *Primary Examiner.*

F. SPEAR, *Assistant Examiner.*